United States Patent
Noguchi

Patent Number: 5,877,866
Date of Patent: Mar. 2, 1999

[54] COLOR IMAGE READOUT APPARATUS

[76] Inventor: Koichi Noguchi, c/o Fuji Photo Optical Co., Ltd. 1-324, Uetakecho, Omiya-shi, Saitama, Japan, 300

[21] Appl. No.: 880,738

[22] Filed: Jun. 23, 1997

[30] Foreign Application Priority Data

Jul. 23, 1996 [JP] Japan .................................. 8-213064

[51] Int. Cl.⁶ ...................................... G02B 27/14
[52] U.S. Cl. ............................................ 358/296; 359/634
[58] Field of Search ............................ 359/634; 358/296, 358/515

[56] References Cited

PUBLICATIONS

Jap. Unexamined Pat.Pub.No. 221930, Aug. 18, 1995, Japan and English Language Abstract, "Color Image Reader".

*Primary Examiner*—Edward H. Tso
*Assistant Examiner*—Gregory J. Toatley, Jr.
*Attorney, Agent, or Firm*—Ronald R. Snider

[57] ABSTRACT

In a color image readout apparatus in which white light is separated into three primary color light components of B, G, and R by means of a beam splitter, predetermined wavelength cut filters are disposed between dichroic mirrors and between a dichroic mirror and a reflection mirror in the beam splitter, so as to prevent unnecessary reflected light components such as multiple reflection light from occurring, whereby a favorable color image is obtained free of color contamination, flare, and ghost. A beam splitter 7 is constituted by a first dichroic mirror 21 for reflecting a B light component in the white light, a yellow filter 22 (cutting off a wavelength of 500 nm and thereunder), a second dichroic mirror 23 for reflecting a G light component in the white light, an orange filter 24 (cutting off a wavelength of 580 nm and thereunder), and a total reflection mirror 25 which are laminated in this order. The yellow filter 22 absorbs the B light component and, of the G light component, a wavelength range component in the vicinity of the wavelength range of the B light component, which may cause color contamination and multiple reflection light, whereby color contamination, flare, and ghost are prevented from occurring due to multiple reflection.

3 Claims, 3 Drawing Sheets

COLOR IMAGE READOUT APPARATUS

RELATED APPLICATIONS

This application claims the priority of Japanese Patent Application No. 8-213064 filed on Jul. 23, 1996, which is incorporated herein by reference.

BACKGROUND OF THE INVENTION

1. Field of the Invention

The present invention relates to a color image readout apparatus and, more specifically, to a color image readout apparatus which separates a color image into color light components and then reads out thus separated color light components.

2. Description of the Prior Art

Various kinds of color image readout apparatus have been proposed, in which a color image is separated into three primary colors of B, G, and R, and the respective color light components in thus color- separated wavelength ranges are read out by a light receiving device.

For example, there has been proposed, as shown in FIG. 5, a color image readout apparatus comprising a light source 31 for emitting white light including the whole desired wavelength range; an imaging optical system 34 for collecting the light reflected from an original 32 mounted on a platen glass 33; a light receiving device 36 in which three pieces of line sensors 51, 52, and 53, respectively set to have three kinds of spectral sensitivity characteristics for B, G, and R, are arranged in a sub-scanning direction on a single chip; and a beam splitter 37, disposed on an optical path between the imaging optical system 34 and the light receiving device 36, in which dichroic mirrors respectively adapted to reflect only predetermined wavelength ranges of light and a total reflection mirror are laminated together with a transparent glass therebetween. In such a color image readout apparatus, the light emitted from the light source 31 and then reflected by the original 32 is separated by the beam splitter 37 into three color light components of B, G, and R which are in parallel with each other, and then the color light components are respectively received by the line sensors 51, 52, and 53 of the light receiving device 36.

Also, there has been proposed, as shown in FIG. 6, a color image readout apparatus comprising a light source 41 for emitting white light including the whole desired wavelength range; an imaging optical system 44 for collecting the light reflected from an original 42 mounted on a platen glass 43; a light receiving device 46 in which three pieces of line sensors 61, 62, and 63, respectively set to have three kinds of spectral sensitivity characteristics for B, G, and R, are arranged in a sub-scanning direction on a single chip; and first and second beam splitters 47 and 48, disposed on an optical path between the imaging optical system 44 and the light receiving device 46, in each of which dichroic mirrors respectively adapted to reflect only predetermined wavelength ranges of light and a total reflection mirror are laminated together with a transparent glass therebetween. In such a color image readout apparatus, the light emitted from the light source 41 and then reflected by the original 42 is separated by the first beam splitter 47 into three color light components of B, G, and R which are in parallel with each other, and then the color light components are reflected by the second beam splitter 48 so as to be respectively received by the line sensors 61, 62, and 63 of the light receiving device 46. Such a case where two pieces of the beam splitters 47 and 48 are used is advantageous in that the optical path lengths of the respective color light components can be made substantially equal to each other.

Though a halogen lamp is often used as the light source in such a color image readout apparatus, it has a characteristic that its spectral energy has a smaller short wavelength component and a greater long wavelength component in the visible light range. Consequently, when the halogen lamp is employed in a color image readout apparatus such as those mentioned above, the readout signals of the respective colors may become out of balance. Accordingly, amplification factors for obtaining the respective readout signals should be adjusted so as to attain substantially the same output level. When the amplification factors differ among the readout signals, however, S/N ratios may vary among the respective colors. As a result, upon final image processing such as masking, the S/N ratio of the signal concerning the B light component, which has a short wavelength, may become low, thereby greatly deteriorating its image quality.

Accordingly, there has been proposed a color image readout apparatus Japanese Unexamined Patent Publication No. 7-221930) in which, in place of the transparent glass constituting the beam splitter, an optical filter such as ND filter or color compensating filter is used such that the color light components forming images on the respective line sensors have substantially the same light quantity, thereby attaining substantially the same amplification factor for the signals corresponding to the respective color light components so as to keep a favorable balance between their S/N ratios, allowing the readout operation to be performed with a high accuracy.

In a beam splitter such as that mentioned above in which a dichroic mirror and a total reflection mirror are laminated together, however, it is very difficult to manufacture a dichroic mirror having 100% transmittance and reflectance for respective color light components. Consequently, in the vicinity of the boundary wavelength between two color light components to be separated, the color light component to be reflected may be transmitted, and thus transmitted color light component may be reflected by the dichroic mirror so as to be made incident on a line sensor which should receive another color light component. Namely, as shown in FIG. 5, of the white light incident on the beam splitter 37, the B light component is reflected by a first dichroic mirror 37A, while the G and R light components are transmitted therethrough. Of thus transmitted G light component, a wavelength component near the wavelength range of B light component may contain a part of the B light component. Such a part of the B light component may be reflected by a second dichroic mirror 37B so as to be made incident on the line sensor 52 for receiving the G light component. Similarly, the R light component transmitted through the second dichroic mirror 37B may contain a part of the G light component and a small amount of B light component, which may be made incident on the line sensor for receiving the R light component.

Also, of the G light component, the most part of a portion in the vicinity of the wavelength range of the B light component is reflected by the second dichroic mirror 37B, and then a part thereof is reflected by the inner surface of the dichroic mirror 37A and further by the second dichroic mirror 37B. Consequently, multiple reflection may occur within the beam splitter 37, and a multiple reflection light component L10 (indicated by a broken line) may be made incident on the line sensor 53 for receiving the R light component in the light receiving device 36. Also, in the color image readout apparatus shown in FIG. 6, multiple reflection light components L11 and L12 may be generated as indicated by broken lines therein. In the reflectance characteristics of B, G, and R shown in FIG. 7, such a multiple reflection light component is generated at a hatched area of the wavelength range.

Thus, an unnecessary multiple reflection light component generated between dichroic mirrors constituting a beam splitter may be made incident on a line sensor which is different from the one that should receive it, whereby color contamination may occur in the line sensor, thus deteriorating the color reproducibility of the resulting image. Also, when an error occurs in the gap amount or parallelism of the dichroic mirrors constituting the beam splitter, a positional deviation may be generated between the normal and contaminated color light components incident on the beam splitter, thereby forming a ghost in the resulting image. Further, depending on the optical path of the contaminated color light component, the normal and contaminated color light components may have different optical path lengths, so as to form images on the beam splitter in a defocused state, thereby generating a flare in the resulting image.

SUMMARY OF THE INVENTION

In view of these circumstances, it is an object of the present invention to provide a color image readout apparatus which can prevent the above-mentioned multiple reflection of incident light from occurring, thereby eliminating color contamination and yielding a favorable image free of ghost and flare.

The color image readout apparatus in accordance with the present invention comprises a light source; an imaging optical system for collecting light reflected by or transmitted through an original illuminated by the light source; light receiving means formed by a plurality of one dimensional light receiving device arrays arranged in parallel with each other; and color separating means, in which a plurality of dichroic mirrors are or a dichroic mirror and a reflection mirror are laminated together with an optical filter therebetween, for separating the light from the original into at least first and second color light components so as to be isolated from each other and respectively collected by the device arrays corresponding thereto in the light receiving means;

wherein the optical filter comprises a wavelength cut filter having a characteristic for substantially cutting off the first color light component and, in the second color light component, a wavelength component near a wavelength component of the first color light component.

Here, the wavelength cut filter refers to low-pass filter, high- pass filter, band pass filter, sharp- cut filter, or the like which, as mentioned above, cuts off the first color light component and, in the second color light component, a wavelength component near a wavelength component of the first color light component by absorbing them. Specifically, it refers to a material which absorbs the above- mentioned color light component and wavelength component, such as color absorbing glass.

Also, the color separating means may be configured such that it separates the light from the original into three primary color light components of blue, green, and red so as to be isolated from each other and respectively made incident on the device arrays corresponding thereto in the light receiving means, and that it is constituted by a first dichroic mirror, a first optical filter, a second dichroic mirror, a second optical filter, and a reflection mirror successively laminated in this order;

wherein the first optical filter is a wavelength cut filter having a characteristic for substantially cutting off the blue light component and, in the green light component, a wavelength component near a wavelength component of the blue light component; and wherein the second optical filter is a wavelength cut filter having a characteristic for substantially cutting off the green light component and, in the red light component, a wavelength component near a wavelength component of the green light component.

DETAILED DESCRIPTION OF THE PREFERRED EMBODIMENTS

In the following, embodiments of the present invention will be explained with reference to the accompanying drawings.

Figure 1:
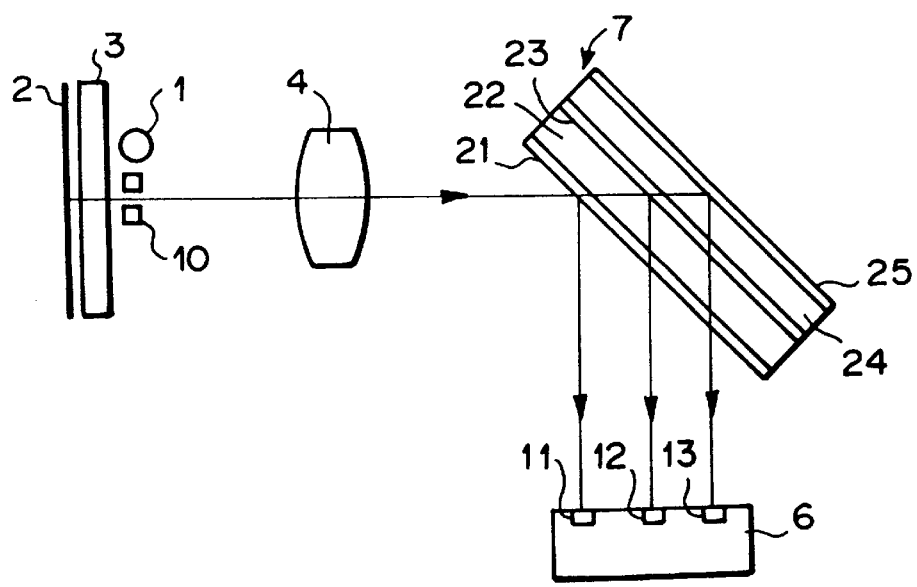
FIG. 1 is a view showing a configuration of a color image readout apparatus in accordance with an embodiment of the present invention.

FIG. 1 is a view showing a configuration of a color image readout apparatus in accordance with an embodiment of the present invention.

As shown in FIG. 1, the color image readout apparatus in accordance with this embodiment comprises a light source 1 constituted by a halogen lamp for emitting white light including the whole desired wavelength range; a slit 10 for restricting a luminous flux of light reflected from an original 2 mounted on a platen glass 3; an imaging optical system 4 for collecting the reflected light; a light receiving device 6 in which three pieces of line sensors 11, 12, and 13, respectively set to have three kinds of spectral sensitivity characteristics for B, G, and R, are arranged in a sub- scanning direction on a single chip; and a beam splitter 7, disposed on an optical path between the imaging optical system 4 and the light receiving device 6, in which two dichroic mirrors respectively adapted to reflect only predetermined wavelength ranges of light and a total reflection mirror are laminated together with wavelength cut filters therebetween which will be explained later. Here, the beam splitter 7 is disposed so as to form an angle of 45 degrees with respect to the optical axis of the imaging optical system 4.

Figure 2:
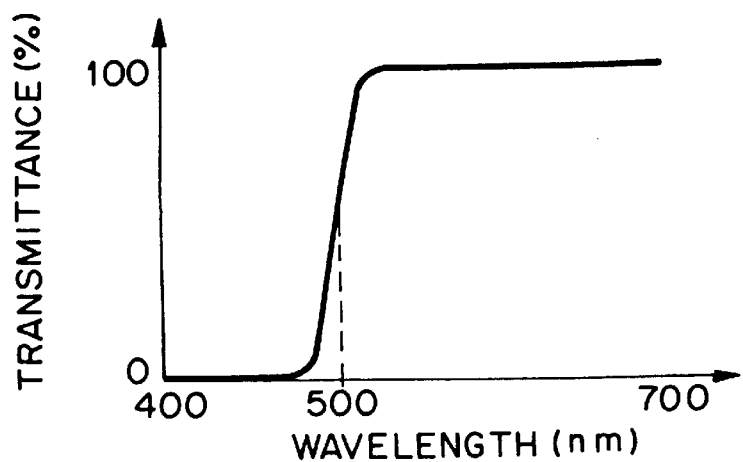
FIG. 2 is a graph showing a transmittance characteristic of a yellow filter.
Figure 3:
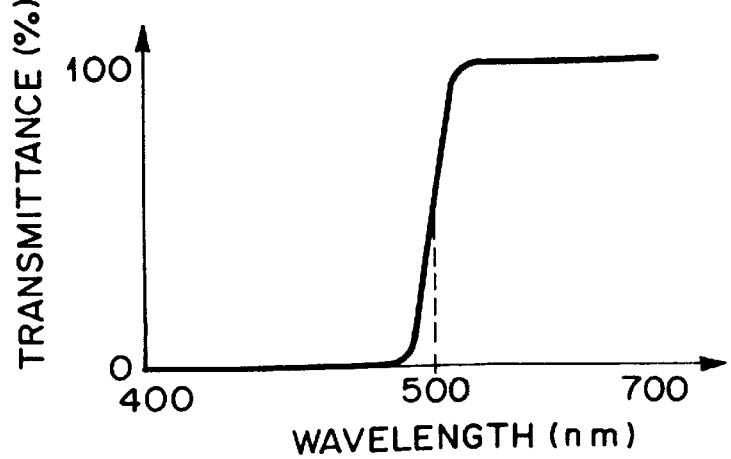
FIG. 3 is a graph showing a transmittance characteristic of an orange filter.

The beam splitter 7 is constituted by a first dichroic mirror 21 for reflecting a B light component in the white light, a yellow filter 22, a second dichroic mirror 23 for reflecting a G light component in the white light, an orange filter 24, and a total reflection mirror 25 which are laminated in this order. Here, as shown in FIG. 2, the yellow filter 22 is a sharp-cut filter having a characteristic such that the mesial point of transmittance is 500 nm, i.e., absorbing light in a range where the wavelength is not longer than about 500 nm while transmitting therethrough only light in a range where the wavelength is not shorter than about 500 nm. For example, Y-50, manufactured by Hoya Corp. is used therefor. Of the white light, the B light component and, of the G light component, a portion in the vicinity of the wavelength range of the B light component are absorbed by the Y-50 filter. As shown in FIG. 3, the orange filter 24 is a sharp-cut filter having a characteristic such that the mesial point of transmittance is 580 nm, i.e., absorbing light in a range where the wavelength is not longer than about 580 nm while transmitting therethrough only light in a range where the wavelength is not shorter than about 580 nm. For example, O-58, manufactured by Hoya Corp. is used therefor. The B and G light components are absorbed by the O-58 filter.

In the following, the operation of this embodiment will be explained.

The white light emitted from the light source 1 irradiates the original 2 mounted on the platen glass 3. The white light is reflected at each position on the original 2 irradiated therewith. Thus reflected light, whose luminous flux is restricted by the slit 10, is collected by the imaging optical system 4 so as to be made incident on the beam splitter 7. Of the reflected light incident on the beam splitter 7, the B light component is reflected by the first dichroic mirror 21 so as to form an image on the line sensor 11 of the light receiving device 6. On the other hand, the G and R light components are made incident on the yellow filter 22. Then, the G light component is reflected by the second dichroic mirror 23 and transmitted through the first dichroic mirror 21 so as to be made incident on the line sensor 12 of the light receiving device 6.

Since the yellow filter 22 absorbs the light in a range where the wavelength is not longer than 500 nm as shown in FIG. 2, the B light component transmitted through the first dichroic mirror 21 without being reflected thereby and, of the G light component, a wavelength range component in the vicinity of the wavelength range of the B light component are absorbed by the yellow filter 22, whereas only the G and B light components can be transmitted through the yellow filter 22. Consequently, the light reflected by the second dichroic mirror 23 includes neither the B light component nor a light component, of the G light component, in a wavelength range near the wavelength range of the B light component. Accordingly, no unnecessary light components other than the G light component are made incident on the line sensor 12 for receiving the G light component. Also, the B light component and, of the G light component, a light component in a wavelength range near the wavelength range of the B light component are prevented from being reflected by the inner wall face of the first dichroic mirror 21 and the second dichroic mirror 23 opposing each other and thereby generating multiple reflection light.

Further, the R light component is transmitted through the second dichroic mirror 23 so as to be made incident on the orange filter 24 and then is reflected by the total reflection mirror 25 so as to be made incident on the line sensor 13. Here, since the orange filter 24 absorbs light in a range where the wavelength is not greater than about 580 nm as shown in FIG. 3, leakage light portions of the G and B light components transmitted through the second dichroic mirror 23 without being reflected thereby are absorbed by the orange filter 24, whereby only the R light component is transmitted through the orange filter 24. Consequently, no unnecessary light components such as multiple reflection light other than the R light component are made incident on the line sensor 13 for receiving the R light component.

Figure 4:
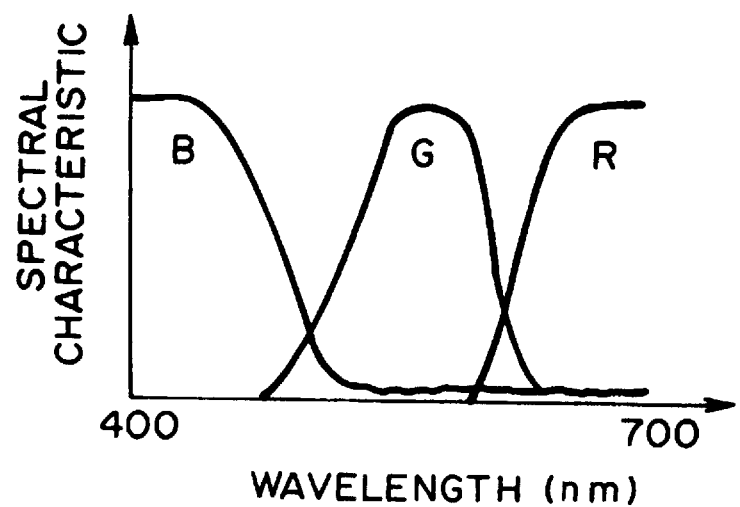
FIG. 4 is a graph showing spectral characteristics of B, G, and R color light components obtained by the color image readout apparatus in accordance with the above-mentioned embodiment of the present invention.
Figure 7:
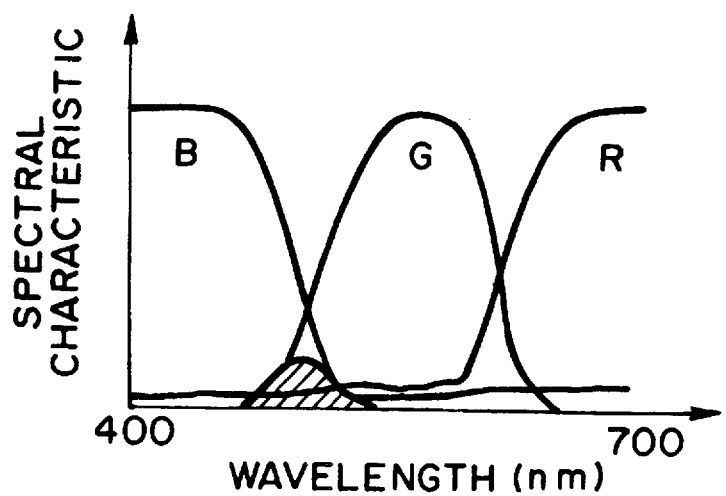
FIG. 7 is a graph showing spectral characteristics of B, G, and R color light components obtained by a conventional color image readout apparatus.
Figure 5:
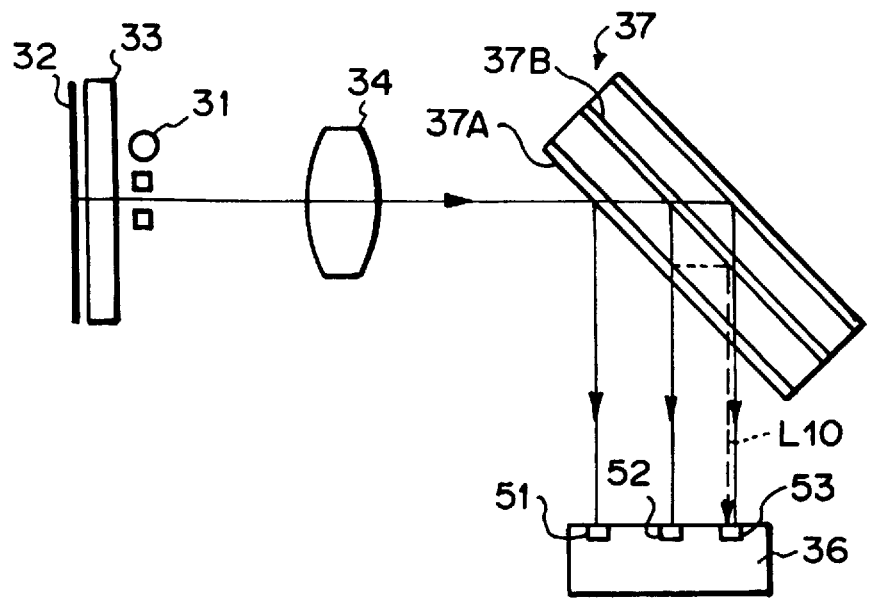
FIG. 5 is a view showing a conventional color image readout apparatus.

FIG. 4 shows spectral characteristics of the respective color light components thus incident on the line sensors 11, 12, and 13 of the light receiving device 6. As compared with the conventional spectral characteristics shown in FIG. 7, in the spectral characteristics of the respective color light components of B, G, and R obtained in the color image readout apparatus in accordance with this embodiment, as shown in FIG. 4, of the G light component, a wavelength range component in the vicinity of the wavelength range of the B light component indicated by the hatched area in FIG. 7, which may cause multiple reflection light, is cut off together with a noise component (component rising above the abscissa where reflectance is 0% in FIG. 7) extending over the whole wavelength range. Accordingly, while multiple reflection light or the like is prevented from occurring, unnecessary light components are kept from being made incident on the individual line sensors 11, 12, and 13 of the light receiving device 6 and thereby generating color contamination. Thus, a favorable image can be obtained free of ghost, flare, and noise.

Figure 6:
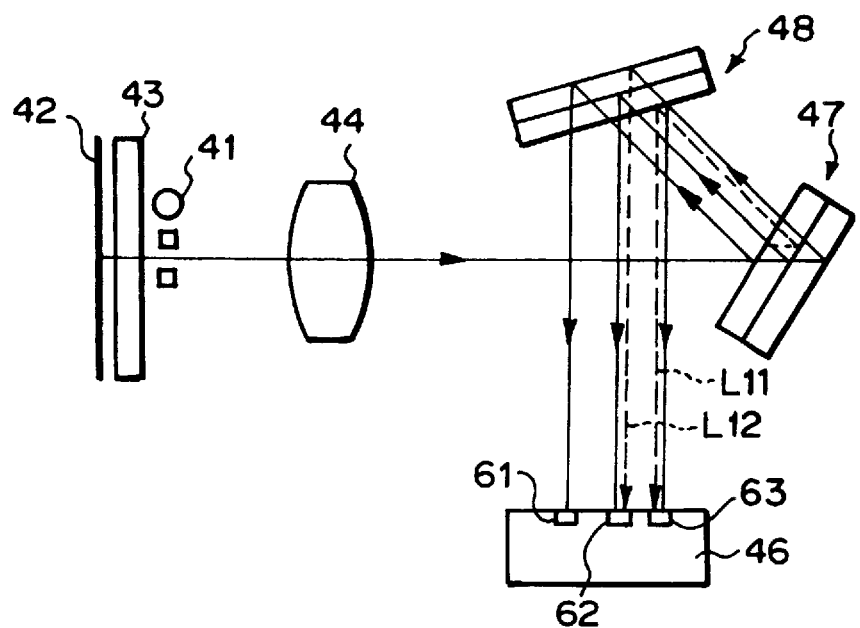
FIG. 6 is a view showing a conventional color image readout apparatus.

Though the white light is separated into three color light components of B, G, and R by the single beam splitter 7 in the above-mentioned embodiment, the present invention is also applicable to a case where, as shown in FIG. 6, two pieces of beam splitters are provided so as to separate the white light into three color light components, while making the color light components have the same optical path length.

Though a sharp-cut filter for mainly cutting the shorter wavelength side by light absorption is used as the optical filter in the above-mentioned embodiment, other wavelength cut filters such as high-pass filter, low-pass filter, and band pass filter may be used as well. Alternatively, a wavelength calibration filter containing a metal such as neodymium or holmium may be used.

As explained in detail in the foregoing, since the optical filter used in the color separating optical system in the color image readout apparatus in accordance with the present invention is constituted by a wavelength cut filter having a characteristic for substantially cutting off the first color light component and, of the second color light component, a wavelength component in the vicinity of the wavelength component of the first color light component, the light incident on the color separating means so as to be separated in terms of color is prevented from generating unnecessary reflection such as multiple reflection. As a result, unnecessary light components are kept from being incident on the light receiving device, whereby a favorable image can be obtained free of color contamination, flare, and ghost.

What is claimed is:

1. A color image readout apparatus comprising:

a light source;

an imaging optical system for collecting light reflected by or transmitted through an original illuminated by said light source;

light receiving means formed by a plurality of one dimensional light receiving device arrays arranged in parallel with each other; and color separating means, in which a plurality of dichroic mirrors, or a dichroic mirror and a reflection mirror, are laminated together with an optical filter therebetween, for separating the light from said original into at least first and second color light components so as to be isolated from each other and respectively collected by the device arrays corresponding thereto in said light receiving means;

wherein said optical filter comprises a wavelength cut filter having a characteristic for substantially cutting off said first color light component and, in said second color light component, a wavelength component near a wavelength component of said first color light component.

2. A color image readout apparatus according to claim 1, wherein said color separating means separates the light from said original into three primary color light components of blue, green, and red so as to be isolated from each other and respectively made incident on the device arrays corresponding thereto in said light receiving means, said color separating means being constituted by a first dichroic mirror, a first optical filter, a second dichroic mirror, a second optical filter, and a reflection mirror successively laminated in this order;

wherein said first optical filter is a wavelength cut filter having a characteristic for substantially cutting off the blue light component and, in the green light component, a wavelength component near a wavelength component of the blue light component; and wherein said second optical filter is a wavelength cut filter having a characteristic for substantially cutting off the green light component and a wavelength component, in the red light component, near a wavelength component of the green light component.

3. A color imaging readout apparatus according to claim 2 wherein said first optical filter is a yellow wavelength cut filter.

* * * * *